UNITED STATES PATENT OFFICE.

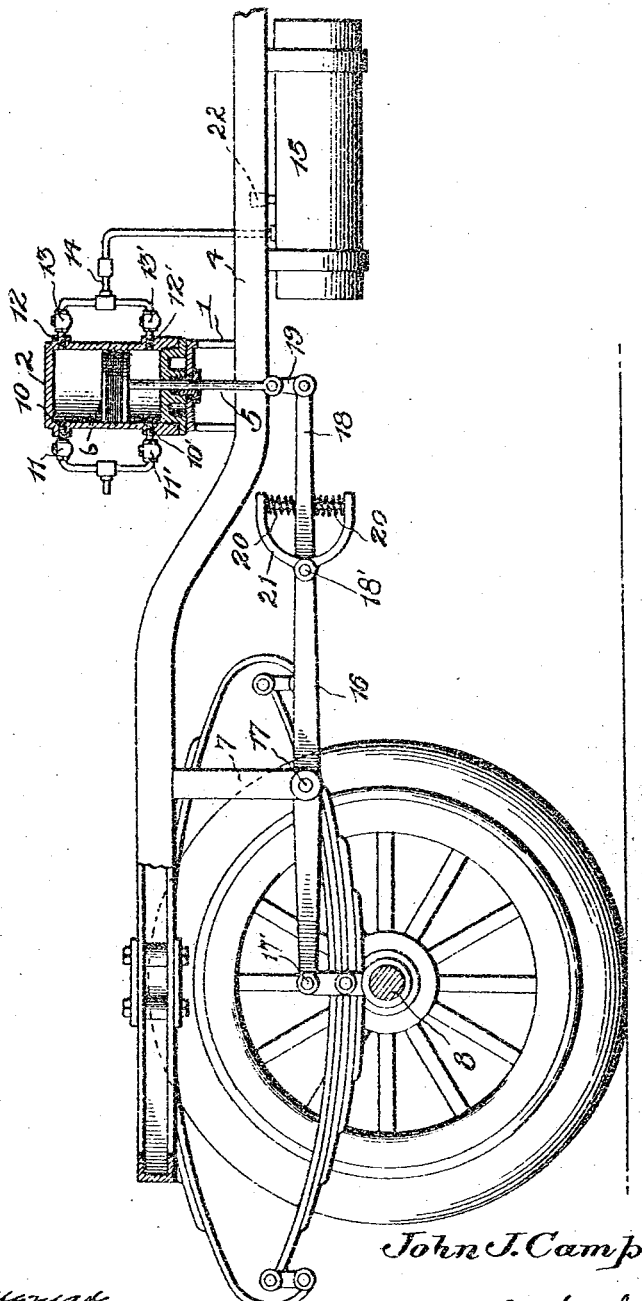

JOHN J. CAMPODONICO, OF STOCKTON, CALIFORNIA.

AIR-COMPRESSING SHOCK-ABSORBER.

1,114,855.

Specification of Letters Patent.  Patented Oct. 27, 1914.

Application filed June 2, 1913.  Serial No. 771,142.

*To all whom it may concern:*

Be it known that I, JOHN J. CAMPODONICO, a citizen of the United States, residing at Stockton, in the county of San Joaquin and State of California, have invented new and useful Improvements in Air-Compressing Shock-Absorbers, of which the following is a specification.

This invention relates to an air-compressing shock-absorber.

The object of the invention is to provide a novel form of shock absorber which will serve as an air compressor to compress air by the relative movement between the vehicle body and running gear and deliver the air to a reservoir which stores and enables the air to be drawn therefrom and utilized for any desired purpose.

Further the invention aims to provide means which is actuated by the body movements to actuate the air compressor, which means may move without actuating the air compressor upon the air in the reservoir reaching a predetermined pressure.

A further object is to provide a shock-absorber which will serve as an air compressor and will operate on the movement of the vehicle body and axles, toward and away from each other, to compress air and deliver it to a storage reservoir from which the air may be drawn and utilized for any desired purpose.

Another object is to provide a combined air compressor and shock-absorber which is compact, simple in construction, efficient in operation, readily applied, and economical to manufacture.

The invention further consists of the parts and the construction and combination of parts as hereinafter more fully described and claimed, having reference to the accompanying drawings, in which the figure is a side elevation, partly in vertical section of the invention applied to a vehicle.

A support 1 is mounted on the body 4 of the vehicle and sustains a cylinder 2 thereon, the stem 5 of a piston 6 projecting downwardly from the cylinder and through an aperture provided therefor in the body 4.

Formed in the walls of the cylinder 2, adjacent to its ends, are inlet ports 10 and 10' which communicate with the atmosphere through inwardly-opening check valves 11 and 11'. Outlet ports 12 and 12' are formed in the cylinder 2 opposite the inlet ports 10 and 10' and open through outwardly-opening check valves 13 and 13' to a pipe or conduit 14, leading to a reservoir 15. The ports 10 and 12 are arranged a short distance from the ends of the cylinder 2 so as to be closed by the piston 6 when the latter nears the limit of its travel in either direction and thereby form an air cushion to retard the movement of the piston and prevent its striking the ends of the cylinder. Upward movement of the piston acts to draw air into the lower portion of the cylinder through the inlet port 10', and to discharge air under pressure from the upper portion of the cylinder through the outlet port 12. Downward movement of the piston 6 draws air into the upper portion of the cylinder 2 through the port 10, and discharges air from the lower portion of the cylinder through the outlet port 12'. The air discharged from the cylinder 2 on the up and down strokes of the piston 6 is delivered under pressure to the reservoir 15 through the pipe 14, from whence it may be drawn off and utilized in any desired manner.

The check valves 13 and 13' serve to prevent the air in the reservoir 15 from being drawn back into the cylinder 2, and the check valves 11 and 11' serve to prevent the air drawn into the cylinder 2 from being discharged therefrom to the atmosphere.

In order to obtain travel of the piston which is greater than the maximum distance which the body 4 can move relative to the axle 8, a lever 16 which has connection with the piston rod 5, is pivotally connected at one end to the axle 8 at 17' and between its ends is pivoted at 17 to a hanger 7 which is connected to and depends from the body 4.

Where a high compression of air in the cylinder 15 is desired, it is necessary to provide means for preventing the stored air pressure from obstructing movement of the vehicle body and axle in relation to each other. The means here shown for accomplishing this purpose, consist of an arm 18, pivoted to the end of the lever 16, and connected to the piston stem 5 by a link 19 and a pair of springs 20 arranged on opposite sides of the arm 18 which connect with the ends of a yoke 21 formed on the lever 16. The springs 20 are of sufficient tension to hold the arm 18 and lever 16 in alinement so that they will operate as one member in ordinary operation, but when the air is compressed sufficiently to overcome the springs 20 they will yield and allow the lever 16 to rock. When the air has been compressed in the reservoir 15 to such an extent as it is capable of being compressed by the piston 6, the latter will not operate to force air into the reservoir, but will compress the air in the cylinder 2; the air in the cylinder alternately compressing and expanding as the piston 6 reciprocates. By the use of this invention, sufficient air may be compressed to operate pneumatic engine starters and other apparatus, and at the same time the act of compressing the air will be effective in absorbing shocks and cushioning the movements of the vehicle body and axles in relation to each other. The extent of compression of air in the reservoir 15 may be regulated by fitting the reservoir with an adjustable puppet valve 22 of any suitable construction.

Having thus described my invention, what I claim and desire to secure by Letters Patent is:

1. In an air compressor of the character described, a cylinder having a piston and a piston rod, and rockable connections with the vehicle frame and the axle, a fulcrumed lever interposed between the axle and the piston rod, said lever having a jointed extension and springs normally retaining the extension in line, and allowing it to yield under excess of pressure.

2. In an air compressor of the type set forth, a cylinder on the vehicle body having a piston and rod therefor, a lever pivotally connected intermediate its ends to the body and being also pivotally connected at its rear end to the axle, a yoke on the front end of the lever, an arm pivotally connected to the front end of said lever and to the piston rod, and a pair of springs interposed between the respective arms of the yoke and the upper and lower faces of said arm at points intermediate the end of said arm.

3. In an air compressor of the type set forth, air compressing means mounted on the vehicle body, a reservoir in communication with said means, a jointed lever mechanism pivoted to the vehicle body and to the axle and connected to the air compressing means, and means for normally preventing breaking of the joint of said lever mechanism and for allowing breaking thereof upon the air in the reservoir reaching a predetermined pressure.

In testimony whereof I have hereunto set my hand in the presence of two subscribing witnesses.

JOHN J. CAMPODONICO.

Witnesses:
JOHN H. HERRING,
W. W. HEALEY.